G. W. NICKERSON
PULLER
Dec. 20, 1932.
Re. 18,701
2 Sheets-Sheet 1
Original Filed July 27, 1931
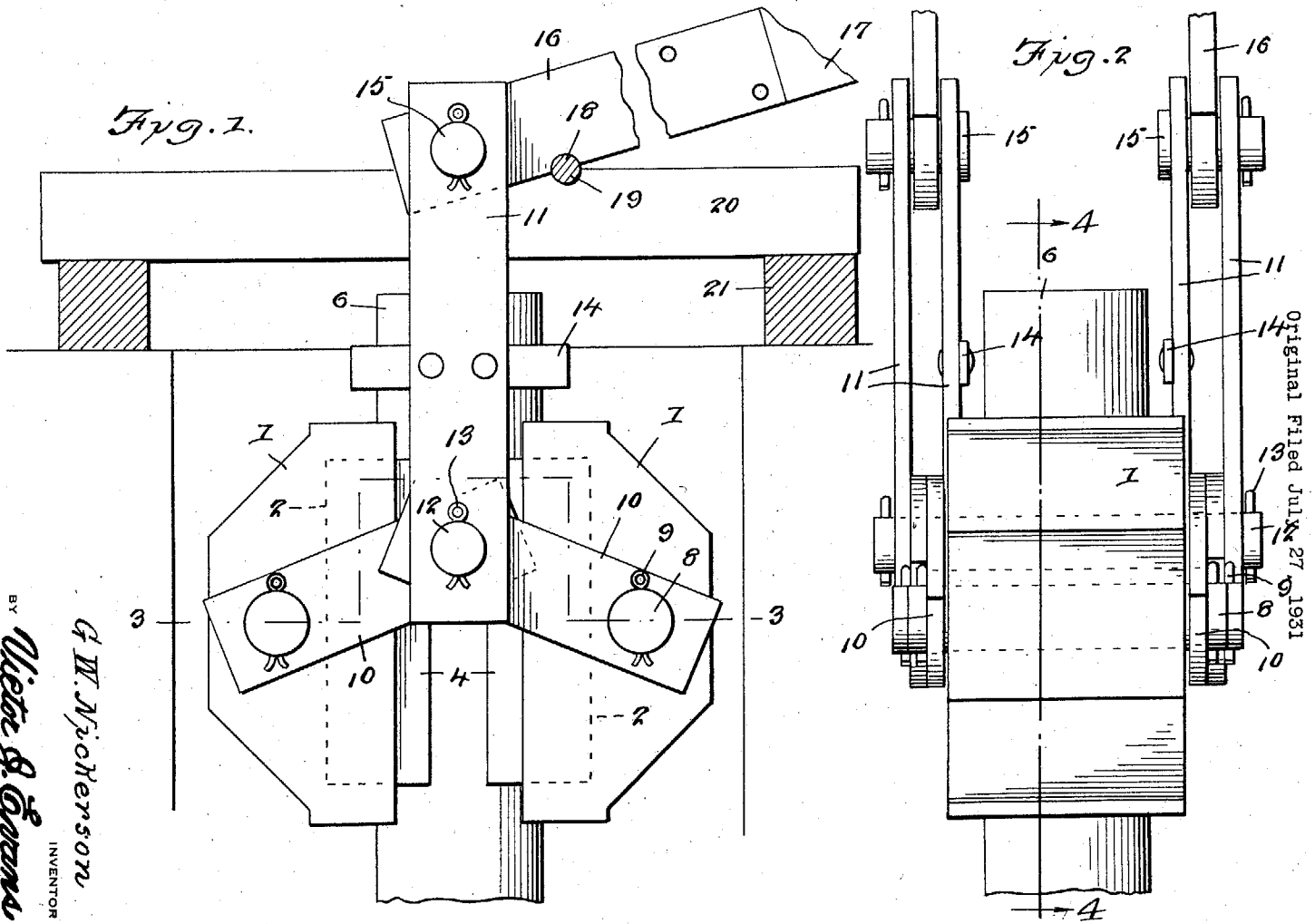
G. W. Nickerson
INVENTOR
BY Victor J. Evans and Co. ATTORNEY G. W. NICKERSON
Dec. 20, 1932. PULLER Re. 18,701
2 Sheets-Sheet 2
Original Filed July 27, 1931
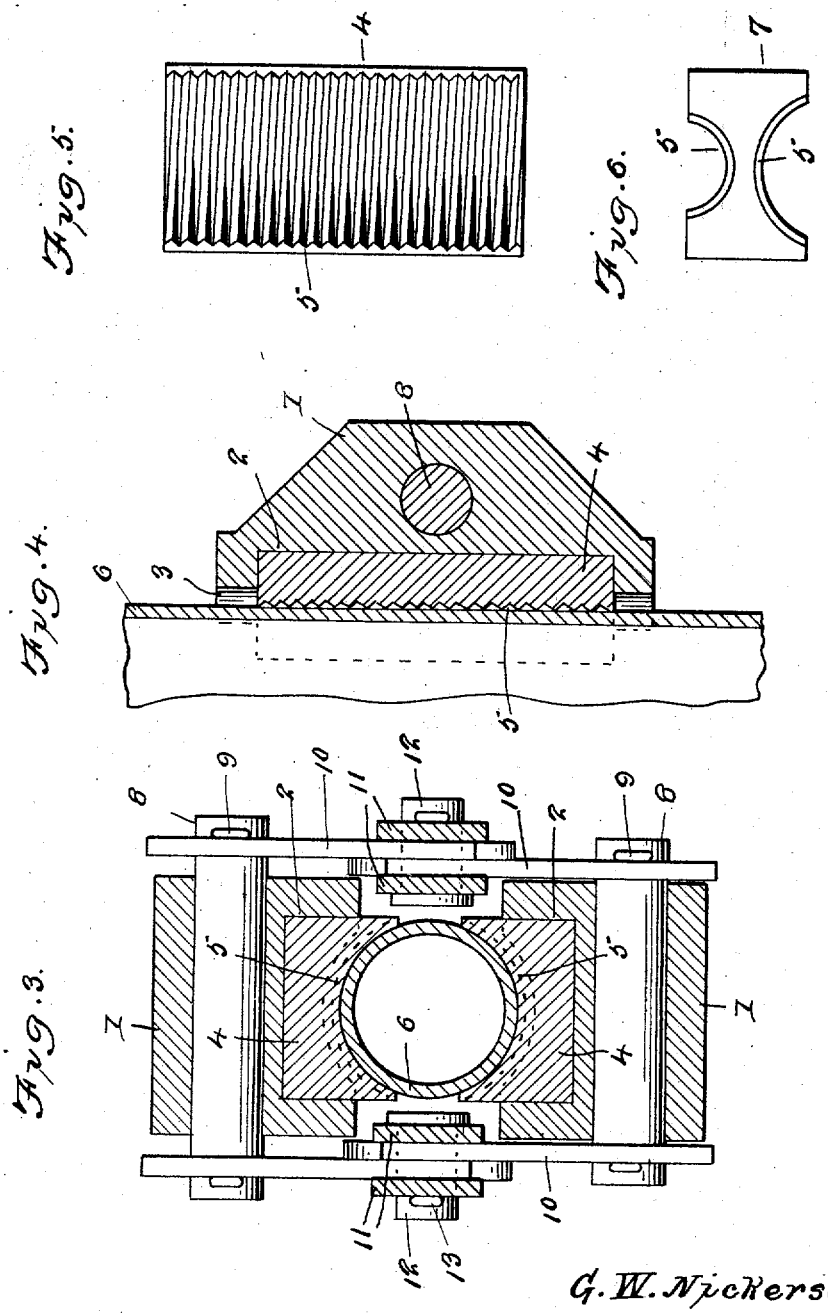
G. W. Nickerson
INVENTOR
BY Victor J. Evans and Co. ATTORNEY Reissued Dec. 20, 1932 Re. 18,701

UNITED STATES PATENT OFFICE

GEORGE WILSON NICKERSON, OF COTUIT, MASSACHUSETTS

PULLER

Original No. 1,877,684, dated September 13, 1932, Serial No. 553,467, filed July 27, 1931. Application for reissue filed October 21, 1932. Serial No. 638,983.

My present invention has reference to a novel construction of pipe lifters and is primarily designed for pulling driven wells.

The object of the invention is the provision of a device for this purpose that is lever operated, and which, through the reciprocatory movement of the lever in vertical directions will cause jaws to be brought against and to tightly grip the well so that when the outer end of the lever is moved downwardly the pipe will be raised and when the said end of the lever is moved upwardly the jaws will be brought out of engagement with the pipe in order to obtain a fresh grip on the pipe, the construction being such that a complete well with strainer or well point may be pulled out of the ground which permits a new strainer or point being driven into the well hole to increase the flow of the well.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a side elevation of the improvement in use.

Figure 2 is a front elevation thereof.

Figure 3 is a sectional view approximately on the line 3—3 of Figure 1.

Figure 4 is a sectional view approximately on the line 4—4 of Figure 2.

Figure 5 is a face view of one of the removable jaws.

Figure 6 is a plan view of another type of jaw.

In carrying out my invention I employ two facing heavy metal blocks 1, respectively. Preferably the outer corners of these blocks are cut at angles, as disclosed by the drawings, and the inner straight face of each of the blocks is formed from its center, and for the major portion of its length with a pocket 2, the inner wall of the pocket being straight and the sides thereof being arranged at a rightangle to the inner wall. The confronting faces of the blocks to the opposite ends of the pocket 2 are provided with round grooves or recesses 3. Each pocket 2 is designed to receive therein the straight sides and inner wall of a jaw member 4. The outer faces of the jaw members are concaved and are formed with transversely arranged teeth 5. Jaws having concaved faces of different widths may be arranged in the pockets to grippingly engage different sized well pipes or tubes 6 and also a jaw, such as illustrated by Figure 6 and indicated by the numeral 7 may be employed. This jaw has both of its faces concaved longitudinally, the said concavities being of different depths and widths and the walls provided thereby are toothed. The jaw 7 may be thus reversely arranged in the pocket 2 to grippingly engage with different pipes or tubes 6.

Passing transversely and centrally through the body of the blocks 1, outward of the pockets 2 there are pins 8, the said pins being held from longitudinal movement by cotter pins 9 that are passed therethrough, and the cotter pins hold on the pins 8 flat but heavy and strong links 10, respectively. The pairs of links on the sides of the cooperating jaw carrying blocks are directed toward each other, but the outer ends thereof are in lapping engagement. Arranged over the outer faces of the respective links there are the lower ends of pairs of heavy metal straps 11—11, respectively, and the headed pins 12 pass through openings in the straps and the links, the said pivot pins being held against longitudinal movement by cotter pins 13 that are passed through the outer ends thereof. Fixed on each of the inner straps 11, at a slight but suitable distance above the upper ends of the blocks 1 there are transversely arranged plates 14. These plates are in the path of contact with the blocks when brought thereagainst and designed to spread the blocks away from each other and consequently move the jaws out of engagement with the pipe 6.

The upper or outer ends of the pairs of straps 11 are pivotally connected by pins 15, which are held from movement by cotter pins to heavy metal bars 16. The respective bars are arranged between the respective pairs of straps 11 and between the bars 16 there is riveted or otherwise rigidly secured a pry bar 17, and this bar is of any desired length. The inner edges of the plates or bars 16, adjacent their pivotal connection with the straps 11 are provided with alining semi-cylindrical openings 18 to receive therein a fulcrum pin 19 which is arranged in similar semi-cylindrical recesses on the upper beams 20 of a platform. The beams 20 are held elevated by transverse blocks or beams 21.

The operator, after the device is arranged in a position to pull the pipe, arranges himself a comparatively great distance away from the blocks, that is, at the outer end of the pry bar and this pry bar is of a comparatively great length. A downward pressure upon the said outer end of the pry bar will cause the straps 11 to swing the links 10 upwardly, thereby forcing the blocks 1 toward each other and consequently forcing the gripping jaws into tight engagement with the pipe. Such movement elevates or pulls the pipe. The pry bar is given a vertical reciprocatory movement in order that fresh pulls and grips may be exerted by the gripping jaws, the outward movement of the pry bar being only slight and sufficient to move the gripping jaws only a slight distance away from the pipe but when the jaws are to be separated or brought a distance away from the pipe the pry bar has its outer end elevated to a determined extent to bring the plates 14 against the top portions of the blocks 1 and to cause the said plates to exert a downward pressure against the blocks, thereby spreading the blocks away from each other and bringing the gripping jaws out of gripping engagement with the pipe.

It is believed the foregoing description will fully and clearly set forth the simplicity of the construction and the advantages thereof to those skilled in the art to which such invention relates so that further detailed description will not be required.

Having described the invention, I claim:

A holder for the driven pipes of wells, comprising facing blocks having pockets therein at the confronting faces thereof, gripping jaws removably received in the pockets, links pivotally secured to the sides of the blocks and having their outer ends arranged in lapping relation, pairs of straps contacting with the outer faces of the links and pivoted thereto, plates pivotally secured to the outer ends of the straps, a pry bar fixed between the plates, an open platform having a transverse fulcrum pin supported thereon, and the plates having their lower edges provided with semi-cylindrical depressions to engage with the pin and a laterally extending plate on each of the inner straps disposed in close proximity to the upper ends of the blocks, for the purpose set forth.

In testimony whereof I affix my signature.

GEORGE WILSON NICKERSON.